United States Patent
Josephsen et al.

[15] 3,694,529
[45] Sept. 26, 1972

[54] METHOD FOR MOLDING ARTICLES
[72] Inventors: Roy C. Josephsen, Hillsdale; Clifford L. Weir, Wayne, both of N.J.
[73] Assignee: Allied Chemical Corporation, New York, N.Y.
[22] Filed: April 2, 1970
[21] Appl. No.: 25,140

[52] U.S. Cl. .................264/48, 264/53, 264/55, 264/328, 264/329
[51] Int. Cl. .................B29d 27/00, B29f 1/06
[58] Field of Search......264/329, 51, 52, 55, 328, 48; 18/30 A; 245/243, 244, 251, 4

[56] References Cited

UNITED STATES PATENTS

| | | | |
|---|---|---|---|
| 3,158,901 | 12/1964 | Westover | 18/30 |
| 3,162,703 | 12/1964 | Eyles | 264/329 X |
| 3,218,375 | 11/1965 | Hardwick | 264/52 |
| 3,436,446 | 4/1969 | Angell | 264/51 |

FOREIGN PATENTS OR APPLICATIONS

| | | | |
|---|---|---|---|
| 976,369 | 11/1964 | Great Britain | 264/328 |
| 1,343,856 | 0/1963 | France | 264/51 |

*Primary Examiner*—Robert F. White
*Assistant Examiner*—Richard R. Kucia
*Attorney*—Michael S. Jarosz

[57] ABSTRACT

This disclosure is directed to a method for injection molding. Shot capacity of injection molding machines is increased by providing a low pressure accumulator which can receive a first charge of prepared molding material from a preparation chamber so as to store the first charge during the preparation of a second charge in the preparation chamber. Upon the completion of the preparation of the second charge, both the first charge from the accumulator and the second charge from the preparation chamber are injected into a mold cavity. Molding with foamable molding material is improved by communicating the accumulator with the mold cavity so as to allow expansion of the foamable molding material into the accumulator from the mold cavity during foaming. Material so received within the accumulator is thereafter recompressed for use as all or part of the first charge for the next subsequent molding cycle.

8 Claims, 9 Drawing Figures

METHOD FOR MOLDING ARTICLES

BACKGROUND OF THE INVENTION

Injection molding of thermoplastic and thermosetting resinous material has come into broad use as a manufacturing process for articles such as toys, furniture, lamp components, wheels, product cases, bowling pins, shoe heels and other relatively inexpensive items. Where the manufacturing materials are expandable or foamable thermoplastic and thermosetting resinous materials, articles such as those listed above have been advantageously manufactured so as to produce a product having a hard, high-density solid shell of material about a lower density, cellular foam core so as to provide a product having relatively high strength while being of relatively low weight.

Considering briefly the known method which has been used in producing products having a high density shell about a lower density foam core, a charge of pressurized gas-expandable molding material containing a blowing agent is injected into an article-defining mold cavity. The charge of material is maintained under pressure in the mold cavity to preclude the blowing agent from expanding while the mold is being cooled so as to form a hardened shell of molding material adjacent the surfaces of the mold cavity. Once the shell has been formed to desired thickness, the pressure on the charge is reduced to allow the expansion of the blowing agent in the unhardened portion of the charge so as to cause production of foam structure within the shell and expulsion of excess molding material from mold cavity. After expansion has continued sufficiently to develop a foam core of desired density, the article is further cooled to finally set the material.

Two difficulties have been encountered in the practice of the above described injection molding process. Initially, the process results in excessive planned wastage of molding material which, although subject to recovery and ultimate use, requires further treatment, thus increasing the cost of the manufacturing operation. Secondly, the development of the injection molding processes for manufacturing cross-sectionally small articles requiring a relatively large volume of molding material results in the use of very large molding machines having excessive structural capacity with the concomitant necessity for a large capital investment.

With respect to difficulties relating to the relatively high degree of planned wastage inherent in the practice of known injection molding processes, there have been many attempts to effectively reduce the wastage. Among these include the concept of allowing excess material to flow back through the system during expansion to become part of the next batch of material to be injected. In this regard, although this approach is fundamentally sound, the known means of implementing such a process have been found to be generally inadequate.

With respect to the second difficulty, i.e., injection molding machines have excessive structural capacity, the accepted approach to the design of injection molding machines has been to relate the structural capacity of the machine, e.g., clamp strength (the capacity of the machine for maintaining a mold die in closed position during injection or pressurized material), to the volume capacity of molding material which can be injected during a single shot. This design relationship is based upon the manufacture of articles which exhibit a relatively shallow depth with a large cross-sectional area, wherein the exertion of pressure by the molding material against such a large cross-sectional area generates a large force which must be compensated by a correspondingly large clamping force in order to preclude the opening of the die during injection.

Where the articles to be manufactured are deep but of relatively small cross-sectional area, a large volume of molding material may be required without the generation of a correspondingly large die-opening force during injection. Known molding machines, however, are not structured in this manner and machines having large shot capacity invariably are structured to support a high clamping force.

SUMMARY OF THE INVENTION

The principal object of the present invention, therefore, is to provide a method for injection molding wherein the size of molding machine for accomplishing the manufacture of an article requiring a relatively high volume of molding material but having a relatively small cross-sectional area, can be substantially reduced over that presently known. It is a further object of the invention to provide a method for injection molding wherein wastage of material is minimized.

The foregoing objects and others not specifically enumerated, are accomplished by the method of the present invention which, with respect to the injection molding of foamable molding material, may include the steps of melting a first charge of foamable molding material to prepare the charge for injection into a mold having a mold cavity, injecting the first charge into an accumulator at a pressure sufficiently high to prevent foaming, maintaining the first charge in the accumulator at a pressure sufficiently high to prevent foaming, melting a second charge of foamable material so as to prepare the charge for injection into a mold having a mold cavity, injecting the first charge into the mold cavity at pressure sufficiently high to prevent foaming, allowing the first and second charges of material under pressure to set in the mold cavity so as to take on the shape of the mold cavity and form a solid skin around the inner surface thereof, and relieving the pressure from the foamable molding material in the mold cavity so as to allow the foaming thereof within the solid skin and the expulsion of excess material out of the mold cavity and back into the accumulator An apparatus in accordance with the teaching of the present invention may include a mold having a mold cavity therein, a chamber for the preparation of molding material prior to injection, a passage between the mold cavity and the chamber for accommodating a flow of molding material therethrough, and accumulator in communication with the passage, means for injecting molding material from the chamber selectively into the cavity and the accumulator, and means for injecting molding material from the accumulator in the cavity.

BRIEF DESCRIPTION OF THE DRAWINGS

A more complete understanding of the present invention and many of its attendant advantages may be had from a consideration of the following detailed description thereof, particularly when read in the light of the attached drawings wherein.

DETAILED DESCRIPTION

Figure 1:
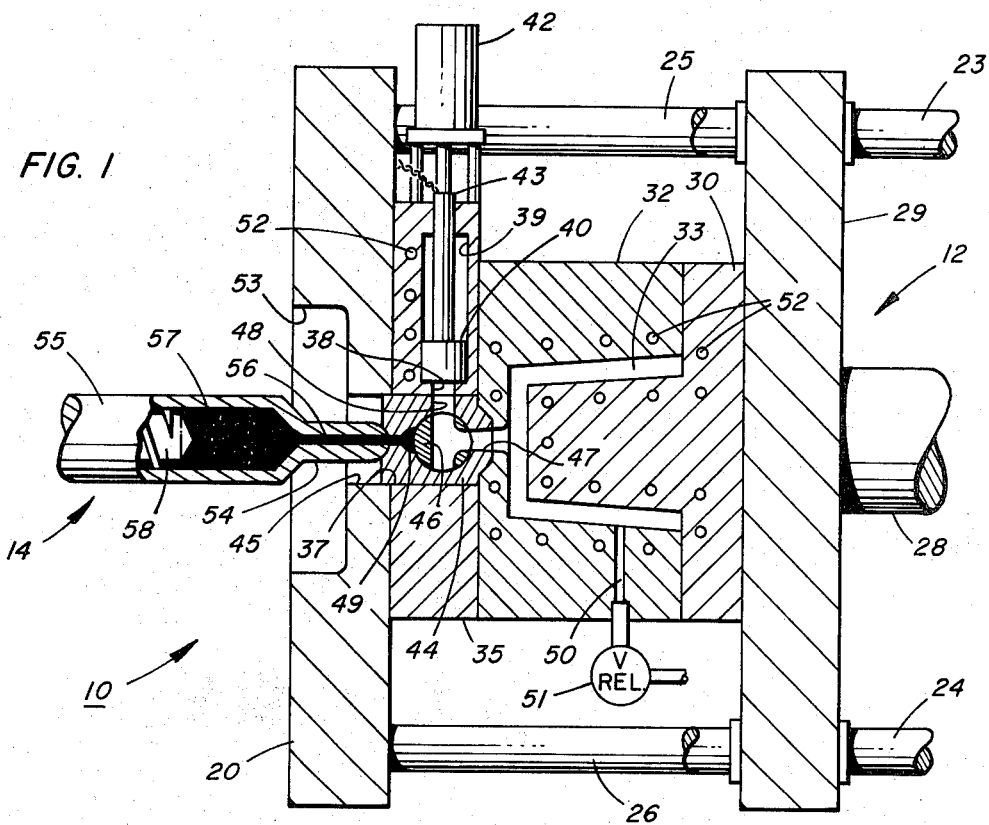
FIG. 1 is an elevational view, partly in section, of an apparatus according to the present invention.

Referring now to FIG. 1, there is shown a novel injection molding apparatus, designated generally by reference numeral 10, for practicing an injection molding method according to the teaching of the invention.

Apparatus 10 comprises a mold section designated generally by the reference numeral 12, and a melting and injection section designated generally by the reference numeral 14. Molding section 12 includes a frame having a front plate 20 which is connected to a back plate (not shown) by four rail members 23, 24, 25 and 26. A ram 28 which is connected to a suitable motive means (not shown) reciprocably drives a mold plate 29 which is slidably mounted on rail members 23 through 26. Mold plate 29 serves as a mounting member for a retractable mold section 30 which cooperates with a stationary mold section 32 to define a mold cavity 33, as is discussed below in detail.

Positioned between stationary mold section 32 and front plate 20 is a molding material accumulator 35 according to the invention. Accumulator 35 is in surface-to-surface contact on one side with the base stationary mold section 32, and in surface-to-surface contact on its other side with front plate 20. Extending longitudinally axially through the body of accumulator 35 is a throughbore 37 which communicates with a centrally disposed radially extending bore 38. Bore 38 is relieved in its central portion to define a chamber 39 in which is slidably received a piston 40. Piston 40 is reciprocably displaced between advanced (FIG. 1), partially retracted (FIG. 2) and fully retracted (FIG. 5) positions by a fluid motor 42 which is connected to a piston 40 by a rod 43.

Mounted in bore 37 is a valve 44 having a generally cylindrical body which extends coaxially from bore 37 into a bore 45 formed in front plate 20 coaxially with bore 37. The direction of flow of molding material through valve 44 is controlled by an alignment cylinder 46 having an axially extending through passage. The passages in cylinder 46 are selectively alignable with an axial sprue passage 47 extending through the body of valve 44 and the base of stationary die 32, a radial flow passage 48 which is coaxial with bore 38 in accumulator 35, and an axial injection passage 49 which communicates alignment cylinder 46 with a source of molding material from melting and injection section 14 as is discussed below.

When apparatus 10 is utilized for the injection molding of foamable molding material, an outwardly extending passage 50 may be provided in stationary mold section 32 for communicating mold cavity 33 with a line source of pressurized nitrogen through a relief valve 51. The relief point of valve 51 is set to preclude build up of nitrogen pressure in cavity 33 beyond predetermined limits. These limits extend from a low value which should be greater than the vapor pressure of the blowing agent utilized with the foamable molding material, to a high point which is less than the injection pressure of the molding material. There also may be provided, in the retractable and stationary mold sections and in accumulator 35 a plurality of passages 52 for accommodating the flow of cooling fluid or heating fluid in order to provide for temperature control of the mold cavity at all times during an injection molding process.

Formed in the surface of front plate 20, and coaxial with throughbore 37 is a counterbore 53 which cooperates with throughbore 37 to accommodate the insertion of an injection nozzle 54 and the charge barrel 55 of melting and injection section 14.

Charge barrel 55 comprises a generally cylindrical barrel having a reduced diameter portion at one end defining the injection nozzle 54. Nozzle 54 has a passage 56 extending longitudinally axially therethrough, which passage cooperates with valve 44, accumulator 35 and sprue passage 47 to define an injection path for communicating mold cavity 33 with a melting and injection chamber 57 formed within charge barrel 55. Barrel 55 may be provided with suitable electric heating bands (not shown) which can be utilized to melt a charge of molding material being prepared for injection. The flow of molding material out of injection chamber 57 through passage 56 is controlled by the positioning of alignment cylinder 46.

Chamber 57 of charge barrel 55 is generally cylindrical having passage 56 at one end and an opening (not shown) at the other end to accommodate the insertion of a rotatably, reciprocable screwdrive 58. Screwdrive 58 is part of a conventional material preparation apparatus adapted to charge chamber 57 with molding material which may be introduced from a suitable apparatus such as a hopper or the like. The screwdrive is ordinarily provided with two distinct sources of motive power (not shown). The first may be a rotational drive for compacting the material within chamber 57 by the rotation of screw 58 and the action of the screw threads against the material. The second may be a reciprocating drive such as a fluid motor or the like, for rapidly advancing screwdrive 58 toward passage 56 during the actual injection of material from chamber 57 into either accumulator chamber 39 or mold cavity 33 as the case may be during the operation of the apparatus.

Considering now the operation of the above-described apparatus for the injection molding of non-foaming molding materials, a batch of material to be injected is deposited in chamber 57 and preheated to a temperature which is sufficiently high to obviate the possibility of premature hardening of the molding material upon injection. It has been found that preheating the mold, accumulator and chamber to a temperature in the range of 200° to 400° F is satisfactory for most applications. Other temperatures may be found to be more appropriate, however, depending upon the material being molded. It should also be noted that for the injection of non-foaming molding material, there is no reason to provide passage 50 and relief valve 51 which define a nitrogen backpressure source. Such a source is useful for the injecting of foamable molding materials as is discussed below in detail.

With alignment cylinder 46 oriented to close passage 49, the charge of molding material is advanced within chamber 57 of barrel 55 into passages 56 and 49 against cylinder 46 (FIG. 1) by the rotation of screwdrive 58. Continued rotation of screwdrive 58 causes the compaction of molding material within chamber 57 as well as a displacement of screwdrive 58 leftwardly as seen in FIG. 1 as a reaction to the compaction of the molding material. With the molding material thoroughly melted and prepared for injection, the reciprocating drive on screwdrive 58 is actuated to displace or tend to displace screwdrive 58 to the right so as to pressurize the charge of material in chamber 56 in anticipation of the discharge of material from the chamber.

Figure 2:
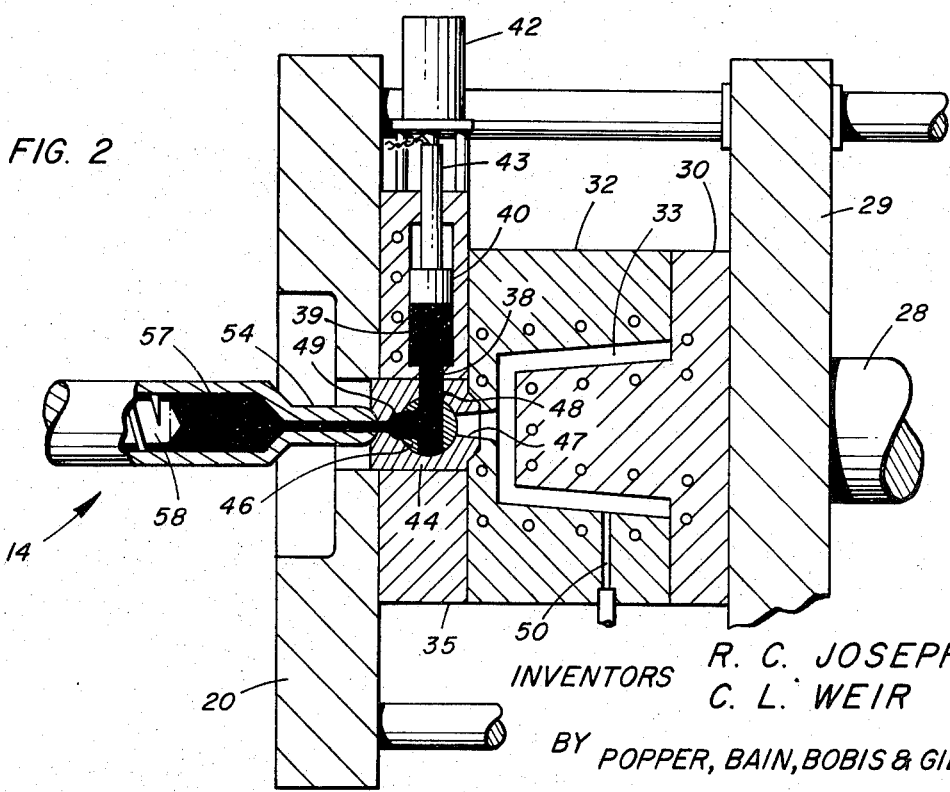
FIG. 2 is an elevational view, partly in section and similar to FIG. 1, but showing the mold apparatus in a stage of present method subsequent to the stage shown in FIG. 1.

Alignment cylinder 46 is then rotated 180° counterclockwise from the position shown in FIG. 1 to that shown in FIG. 2 to align passage 49 with radial passages 48 in valve 44 and 38 in accumulator 35. Screwdrive 58 is then advanced to the right to cause injection of the molding material from chamber 57 into accumulator chamber 39 (FIG. 2). The injection of molding material into chamber 39 displaces piston 40 from the fully advanced position (FIG. 1) to a partially retracted position (FIG. 2). The material so injected into accumulator 35 thus defines a first charge of material for injection into mold cavity 33.

With the first charge of molding material received in chamber 39, fluid motor 42 is actuated to maintain the position of piston 40 as shown in FIG. 2, and a second charge of molding material is prepared within chamber 57 in the manner discussed above. When the second charge of material is prepared, the alignment cylinder 46 of valve 44 is rotated 90° clockwise, i.e., from the position of FIG. 2 to the position of FIG. 3, concurrently, fluid motor 42 is actuated to advance piston 40 to expel molding material from chamber 39 and into mold cavity 33 through sprue passage 47, cylinder 46 and passages 38 and 48. Thereafter, screwdrive 58 is advanced rapidly to the right (FIG. 4) to inject the second charge of molding material from chamber 57 through passages 56 and 49, cylinder 46 and sprue passage 47 into mold cavity 33. At this stage, mold cavity 33 is filled with molding material under pressure which can be caused to set as desired by the circulation of fluids at desired temperatures through passages 52.

The injection sequence, i.e., the operation of apparatus 10 in such a manner as to inject molding material from accumulator 35 into the mold cavity and thereafter to inject material from the chamber 57 into the mold cavity 33 obviates the necessity for accumulator 35 to be constructed with a capability for withstanding high pressures. More specifically, the injection of molding material ordinarily includes exerting and maintaining a high pressure, e.g., 20,000 p.s.i., against the material upon filling of the mold cavity so as to insure a complete identity between the molding material and the mold cavity surface. Such pressure is exerted only after the cavity is filled, however, and a much lesser pressure, e.g., 3,000 –5,000 p.s.i., is experienced during ordinary filling. Thus, by maintaining piston 40 in the fully advanced position (FIG. 3) during the execution of such high pressures, the remaining portions of the accumulator structures are isolated from the high pressures and need not be constructed with a structural capacity to withstand more than the lower pressures experienced during injection. The piston 40 can be maintained in advanced position against the effect of high pressure by the force of fluid motor 42, or a mechanical locking device (not shown) can be utilized to assist fluid motor 42 in supporting piston 40 against the high pressures.

While the material in mold cavity 33 is setting, alignment cylinder 46 may be rotated 180° to the position communicating chamber 57 with bore 38 in accumulator 35. Fluid motor 42 is actuated to maintain piston 40 in its advanced position and a new charge of molding material is prepared in the manner discussed above. Upon completion of the preparation of the molding material, the prepared material is discharged from chamber 57 into accumulator chamber 39 to constitute a first charge of molding material for the next subsequent molding cycle and a second charge of material is prepared.

During the preparation of the first and second charges of molding material for the next subsequent molding cycle, and upon the completion of sufficient setting of the material in mold cavity 33 to enable the material to retain its shape upon the release of pressure therefrom, ram 28 is actuated to retract mold section 30 from stationary mold section 32, the completed article is removed ram 28 is actuated to advance mold section 30 into cavity-defining position and the cycle is repeated.

It can be seen from the foregoing that apparatus 10 can be utilized to injection mold an article requiring a high volume of molding material but having a relatively small cross-sectional area by accomplishing each injection operation in stepped preparation sequence so that size of the molding machine can be dictated by required clamp capability rather than by shot volume. It should also be noted that existing molding machines can be modified to achieve the capability of increased shot volume according to the invention by providing an accumulator section between an existing front plate and an existing stationary mold section as shown. The modification of existing machinery in this manner can increase the shot capacity by any amount desired and the capability of the machine will only be limited by its clamp strength.

The apparatus 10 of FIGS. 1–6 may also be operated to accommodate the injection molding of foamable molding materials. Considering the operation of the machine for this purpose, a batch of material to be injected is deposited in chamber 57 and suitably preheated as discussed above. As is the case with respect to nonrfoaming materials, it has been found that preheating the mold, accumulator and chamber to a temperature in the range of 200° to 400° F is prefereable for most applications, however, other temperatures may be found to be more appropriate, depending upon the material being molded. Generally, the higher mold temperatures are helpful in obtaining a good surface finish. Concurrently with the heating of the mold sections and accumulator, a charge of gaseous substance such as pressurized nitrogen may be introduced to mold cavity 33 through passage 50.

As noted above, the pressure of the nitrogen should be higher by some degree than that pressure below which the molding material will commence foaming so as to preclude foaming of the molding material during injection, and lower than the pressure of injection so as not to interfere with the injection process. It is to be noted, also, that while the present invention is being described in terms of nitrogen being used as a preferable pressurizing gas for mold cavity 33, other substantially inert gases may be used with satisfactory results. Further, if the shape of the article or the volume of the mold cavity to be filled is such that injection of a complete shot of material can be accomplished in such a short period of time as to preclude the possibility of premature foaming of the material, the use of a back pressure vapor in the mold cavity may be dispensed with altogether. The use of such back pressure gas, therefore, is determinable by each individual molding requirement and must be considered in that light.

With alignment cylinder 46 oriented to close passage 49, the charge of molding material is advanced within chamber 57 of barrel 55 into passages 56 and 49 against cylinder 46 (FIG. 1) by rotating screwdrive 58. Continued rotation of screwdrive 58 causes the compaction of molding material within chamber 57 as well as a displacement of screwdrive 58 leftwardly as seen in FIG. 1 in reaction to the compaction of the molding material.

With the molding material thoroughly melted and mixed with the blowing agent, the reciprocating drive on screwdrive 58 is actuated to displace or tend to displace screwdrive 58 to the right so as to pressurize the charge in chamber 56 in anticipation of discharge of the material from the chamber.

Alignment cylinder 46 is then rotated 180° counterclockwise from the position shown in FIG. 1 to that shown in FIG. 2 to align passage 49 with radial passages 48 in valve 44 and 38 in accumulator 35. Screwdrive 58 is then advanced to the right to cause injection of the molding material from chamber 39 (FIG. 2). The injection of the molding material into chamber 39 displaces piston 40 from the fully advanced position (FIG. 1) to the partially retracted position shown (FIG. 2). During this advancement, sufficient force is generated through fluid motor 42 against the material to maintain the pressure on the injected material sufficiently high to preclude the possibility of premature foaming. Although capable of preventing foaming, the pressures involved are relatively low as compared to the pressure exerted against the material upon the completion of injection while the material is setting. The material so injected into accumulator chamber 39 defines a first charge of material for injecting into mold cavity 33.

Figure 3:
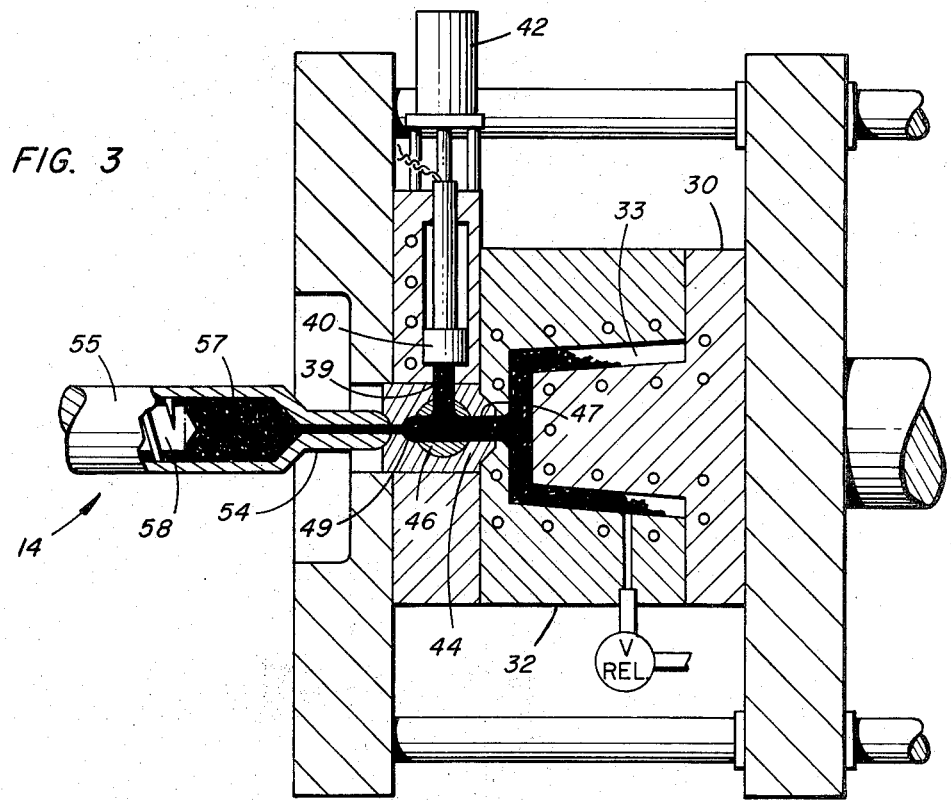
FIG. 3 is a view similar to that of FIG. 2, but showing a stage of the present method subsequent to the stage shown in FIG. 2.

With the first charge of molding material maintained under pressure in chamber 39 of accumulator 35, a second charge of material is prepared in chamber 57 of barrel 55 in the same manner discussed above with respect to the first charge. Upon the completion of the preparation of the second charge (FIG. 2), the alignment cylinder 46 of valve 44 is rotated 90° clockwise, i.e., from the position of FIG. 2 to the position of FIG. 3. Concurrently, fluid motor 42 is actuated to advance piston 40 to expel the first charge of molding material from accumulator chamber 39 into mold cavity 33 through passages 38 and 48, cylinder 46 and sprue passage 47 (FIG. 3). Thereafter, screwdrive 58 is advanced rapidly to the right (FIG. 4) to inject the second charge of molding material from chamber 57 through passages 56 and 49, cylinder 46 and sprue passage 47 into mold cavity 33 to completely fill mold cavity 33 and to exert and maintain a high pressure on the foamable molding material. As was noted above, the piston 40 is maintained in advanced position during pressurization to isolate the accumulator from the effect of the high pressure.

During the injection of the foamable molding material to mold cavity 33 the pressurized nitrogen contained therein precludes premature foaming of the molding material but does not interfere with the injection since, as injection progresses, excess nitrogen is exhausted from the cavity under controlled conditions through relief valve 51, which is noted above, as pre-set at some pressure greater than vapor pressure of the blowing agent utilized in the molding material but less than the injection pressure of the molding material.

Figure 4:
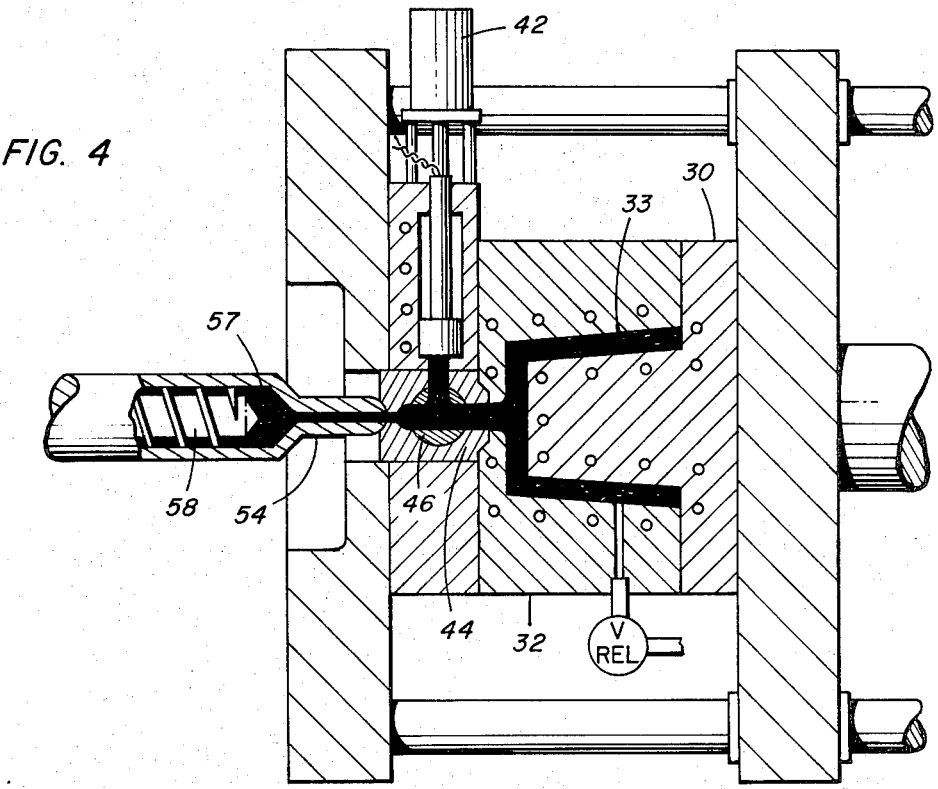
FIG. 4 is a view similar to that of FIGS. 2 and 3, but showing a stage of the present method subsequent to the stage of FIG. 3.

Upon the completion of injection so that all the nitrogen is removed from mold cavity 33, the apparatus is oriented as shown in FIG. 4, mold cavity 33 is filled with molding material, and pressure of magnitude sufficient to prevent foaming is maintained upon the molding material by the compressive force of screwdrive 58 while a solid outer layer or skin of material is being formed within the mold. The thickness of the outer layer is controllable as a function of the temperature of the surface of molding die sections 30, 32 as well as of the amount of time that the material is maintained within the cavity under pressure. In this regard, further control is available because heat exchange fluid can be provided to circulate through passages 52 in the mold sections so that the temperature of the surface of the dies in the mold cavity 33 can be controlled at all times during the process.

Figure 5:
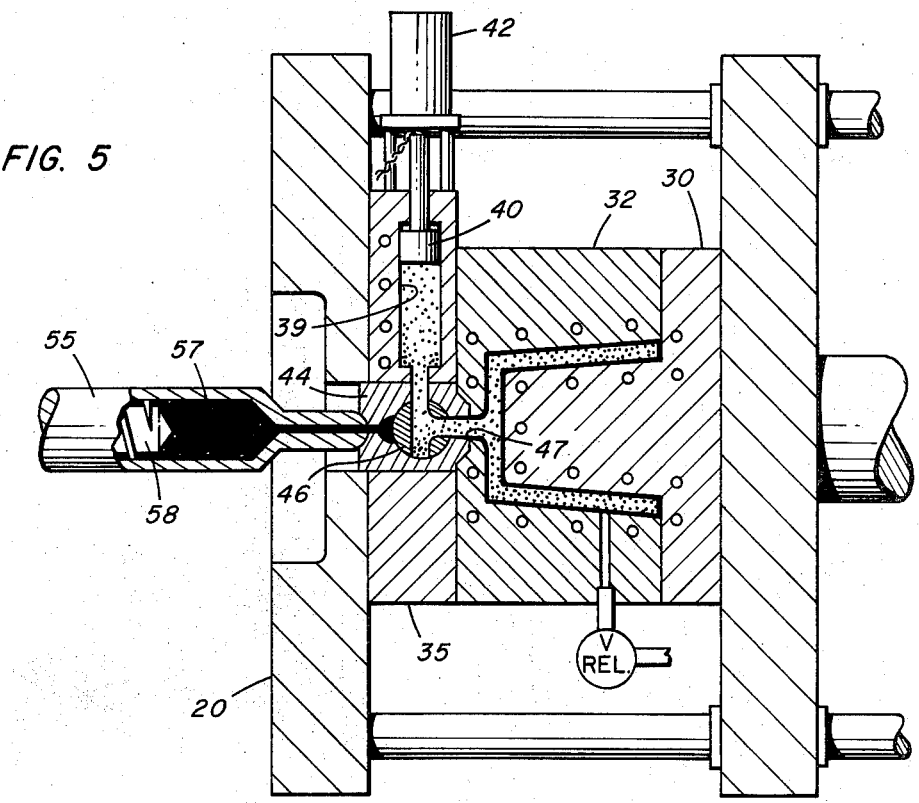
FIG. 5 is a view similar to that of FIGS. 1-4, but showing a stage of the present method subsequent to the stage shown in FIG. 4.

Once a solid skin of plastic material has been formed as desired, alignment cylinder 46 of valve 44 is displaced 90° clockwise from the position shown in FIG. 4 to the position shown in FIG. 5, so as to align mold cavity 33 with accumulator chamber 39 through sprue passage 47, cylinder 46 and passages 38 and 48.

Concurrently with the alignment of cylinder 46 to communicate mold cavity 33 with accumulator chamber 39, fluid motor 42 is operated to retract piston 40 to fully retracted position (FIG. 5) to provide a space in chamber 39 to receive molding material discharged as excess material from mold cavity 33 during expansion. A desirable design of apparatus 10 would provide sufficient travel of piston 40 to create a volume in chamber 38 which is sufficiently large to accommodate foamed material in an amount at least equal to a first charge of molding material. Thus, upon the completion of discharge of excess material from mold cavity 33, alignment cylinder 44 is rotated 180° from the position shown in FIG. 5 to the position shown in FIG. 6 and concurrently, fluid motor 42 is actuated to compress the excess molding material within chamber 39 for use as the first charge in the next subsequent molding cycle. As the material in accumulator chamber 39 is being recompressed, a second charge of molding material is being prepared within barrel 55 in the manner discussed above, and upon the completion of the preparation of this second charge, the apparatus is prepared for the injection of materials in the next subsequent molding cycle.

Figure 6:
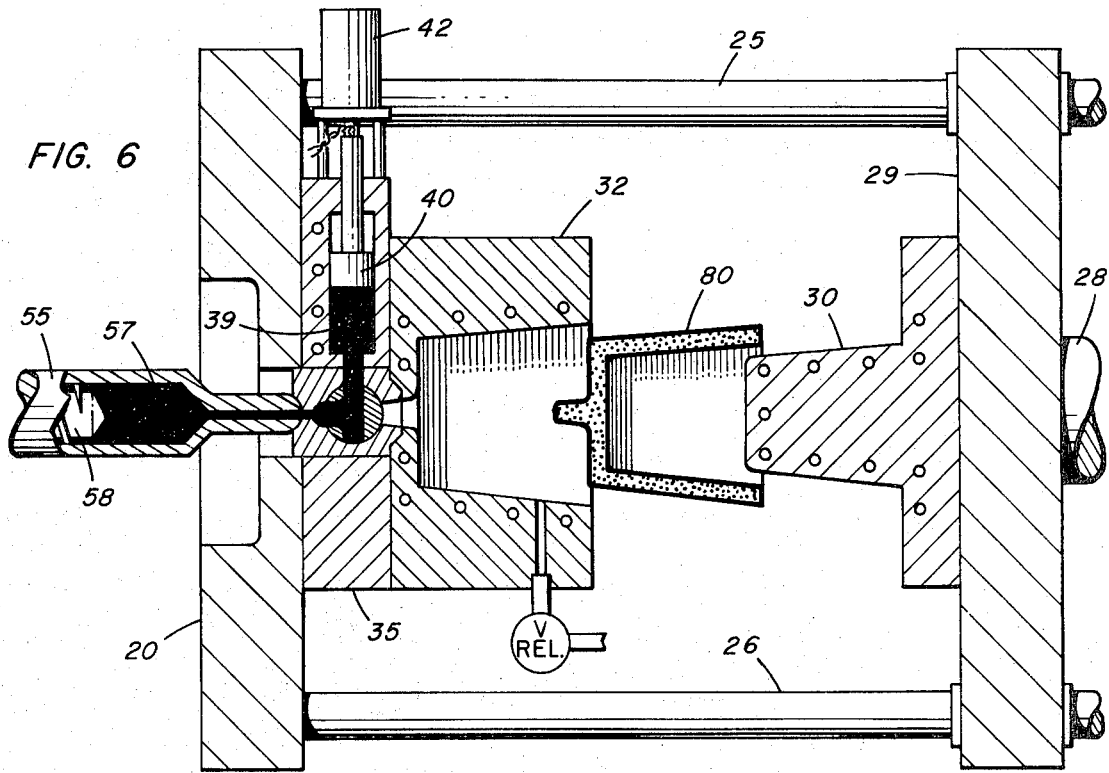
FIG. 6 is a view similar to that of FIGS. 1-5, but showing a stage of the present method subsequent to the stage shown in FIG. 5.

Concurrently with the recompression of material in chamber 39 and the preparation of a second charge for the next subsequent molding cycle, ram 28 is actuated to retract mold section 30 so as to permit removal of the product 80 as is best seen in FIG. 6. When the product is removed, mold section 30 is advanced to molding position by the actuation of ram 28 and the entire cycle may be repeated.

It can be seen, therefore, that the above described method of the present invention provides for the preparation of two charges of molding material for the injection molding of an initial article and thereafter for the preparation of only one additional charge of material for each subsequent article because the excess molding material from the prior shot expands into and is recompressed in the accumulator for use as a first charge in the next subsequent cycle.

The embodiment of apparatus according to the invention as seen in FIGS. 1-6 is useful for injection molding through a center sprue. For the injection molding of articles according to the method of the invention wherein it is desirable to utilize plural sprue openings, an apparatus according to the invention as shown in FIGS. 7-9 may be utilized.

Figure 7:
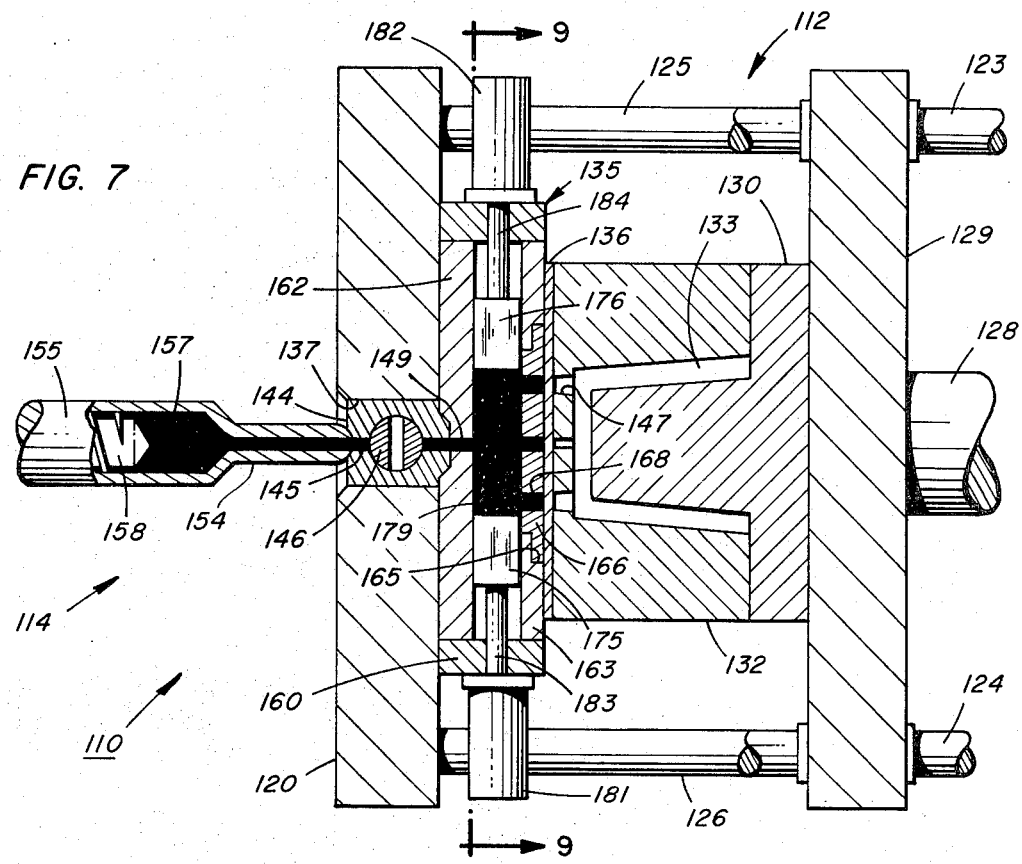
FIG. 7 is an elevational view, partly in section, of a second embodiment of apparatus according to the present invention.
Figure 8:
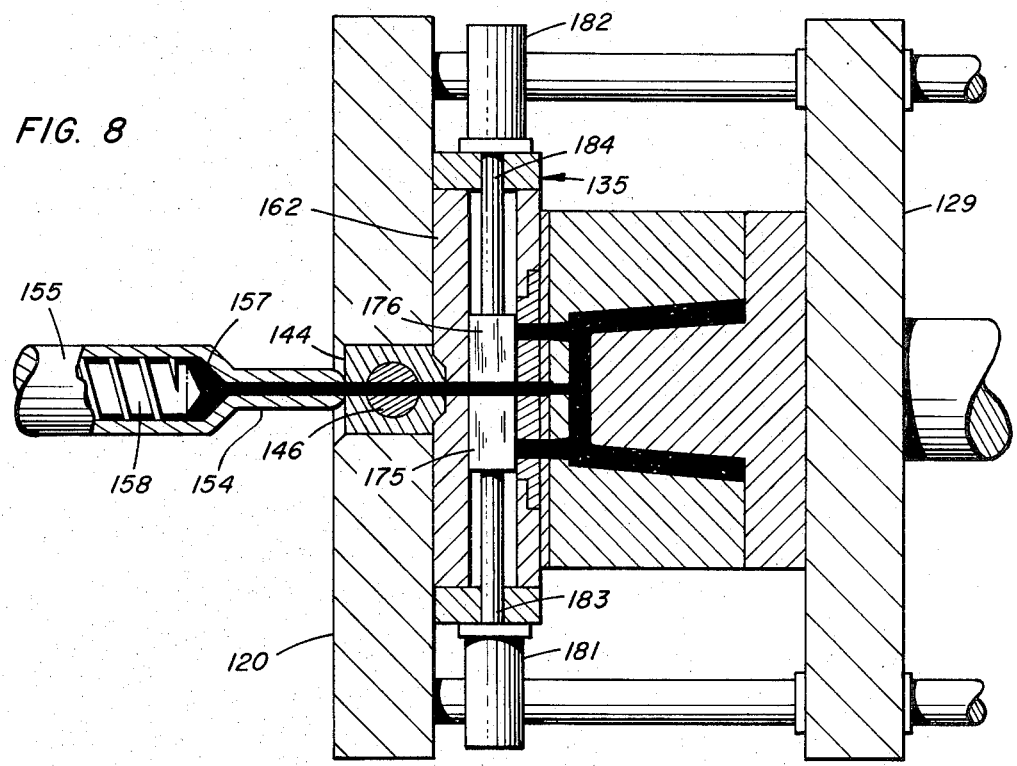
FIG. 8 is a view similar to that of FIG. 7, but showing a stage of the present method subsequent to the stage shown in FIG. 7.
Figure 9:
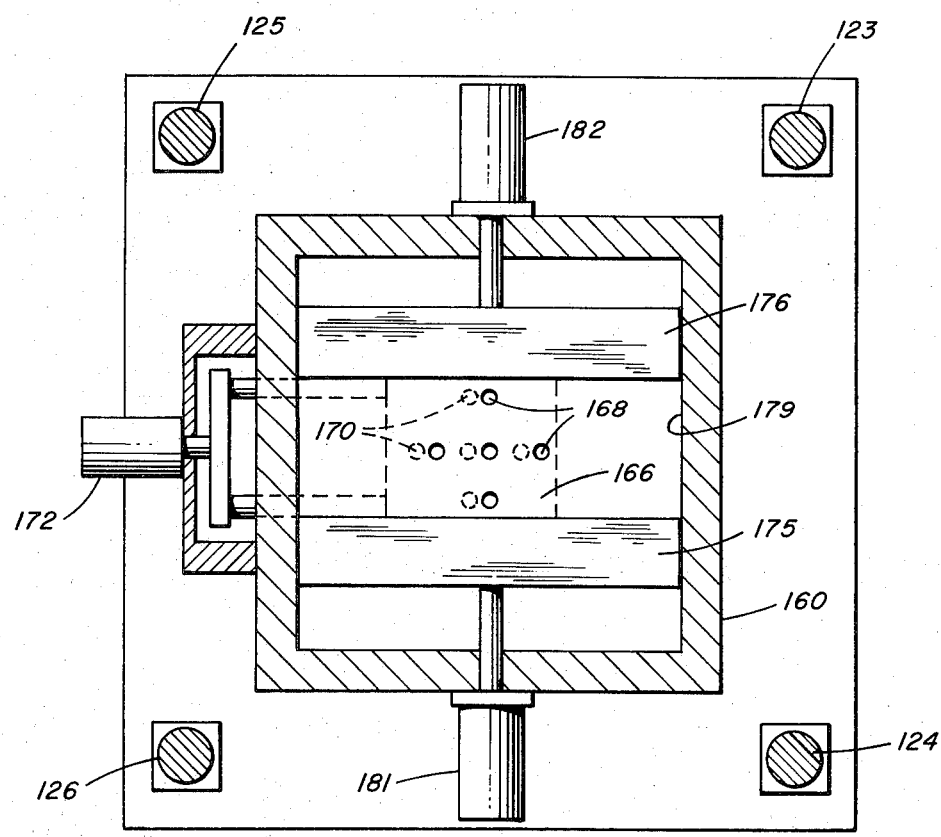
FIG. 9 is a cross-elevational view through plane 9—9 of FIG. 7.

Considering therefore FIGS. 7-9, there is shown an injection molding apparatus designated generally by the reference numeral 110. Similarly to apparatus 10 of the embodiment of FIGS. 1-6, apparatus 110 comprises a molding section designated generally by the reference numeral 112, and a melting and injection section generally designated by reference numeral 114. Molding section 112 includes a frame having a front plate 120 and back plate (not shown) connected by four rail members 123, 124, 125 and 126. A ram 128 which is operably secured to a suitable motive means (not shown) reciprocably drives a mold plate 129 which is slidably mounted on rail members 123-126. Mold plate 129 serves as a mounting member for retractable molding section 130 which cooperates with a stationary mold section 132 to define mold cavity 133 which is shaped in accordance with the shape of the article to be formed.

Positioned between stationary mold section 132 and front plate 120 is an accumulator 135. Accumulator 135 is in surface-to-surface contact at one side with front plate 120 on its opposed side with a valve plate 136 which is slidably received between accumulator 135 and stationary mold section 132. With particular reference to FIG. 9, accumulator 135 can be seen to comprise a generally rectangular frame 160 which is closed on its front plate-adjacent side by a plate 163 (FIG. 7). Plate 163 is provided with a plurality of sprue openings 168, the size and configuration of which are determinable from the nature of the article being formed. Thus, for the injection molding of any particular article, stationary mold section 132 is provided with sprue openings 147 which accommodate the efficient injection of molding material into the die cavity 133 and a sprue plate 166 having openings corresponding to the die sprue openings is utilized. In this regard, sprue plate 166 is provided as a separate component rather than being integral with plate 163 in order to provide for the rapid and efficient substitution of sprue plates and dies when changing the apparatus from the molding of one article to the molding of another.

Valve plate 136 which is positioned between plate 163 and stationary mold section 132 is provided with a plurality of openings 170 which correspond in size and arrangement to the sprue openings 168 and 147 in sprue plate 166 and mold section 132 respectively. Valve plate 136 is slidably reciprocable by a motive means such as fluid motor 172, between a flow permitting position with holes 170 in registry with sprue openings 147 and 168 (the position shown by solid lines in FIG. 9) and a flow interrupting position with holes 170 out of registry with sprue openings 147 and 168 (the position shown by broken lines in FIG. 9). As is discussed below in detail, valve plate 136 is operated during the injection molding cycle to selectively block and unblock the sprue passages as required by the process.

Slidably mounted within the volume defined by frame 160 and plates 162 and 163, are opposed pistons 175 and 176 which cooperate with frame 160 and plates 162, 163 to define a molding material accumulator chamber 179. Pistons 175 and 176 are rectangular pistons which are reciprocable between fully advanced (FIG. 8), partially retracted (FIGS. 7 and 9) and fully retracted (not shown) pistons by fluid motors 181 and 182 which are operably connected to pistons 175 and 176 by rods 183 and 184, respectively.

Formed in plate 162 of accumulator 135 is a longitudinally axially extending throughbore 149 which is coaxial and in communication with a throughbore 137 in front plate 120. Mounted in throughbore 137 is a valve 144 having a generally cylindrical body which extends coaxially within bore 137 and into a counterbore in plate 162. Valve 144 is provided with a longitudinally axially extending bore 145 which communicates with throughbore 138 in front plate 120. Flow of molding material through bore 145 is selectively permitted or interrupted by the positioning of a rotatable alignment cylinder 146 having a flow passage therethrough. Thus, alignment cylinder 146 may be rotated 90° by means (not shown) between flow permitting (FIG. 8) and flow restricting (FIG. 7) positions during an injection molding cycle.

Formed in the surface of front plate 120, and coaxial with throughbore 145 is a counterbore which cooperates with throughbore 145 to accommodate the insertion of an injection nozzle 154 of the charge barrel 155 of melting and injection section 114. Molding and injection section 114 of this embodiment is identical to that of the embodiment of FIGS. 1-6 and, briefly, comprises generally cylindrical charge barrel 155 having a reduced diameter portion at one end defining the injection nozzle 154. Nozzle 154 has a passage 156 extending longitudinally axially therethrough which cooperates with valve 144 and throughbore 149 to define an injection path for communicating accumulator chamber 179 with a melting and injection chamber 157 formed in barrel 155. Melting and injection chamber 157 is provided with a screwdrive 158 which is capable of both rotation and reciprocation in the manner described above with respect to screwdrive 58 of FIGS. 1–6.

Although the embodiment of FIGS. 7–9 is not shown in the drawing as having either means for controlling the temperature of the barrel, accumulator and molds sections, or means for providing a gaseous back-pressure in order to preclude premature foaming of foamable molding material it should be recognized that these features may be incorporated in the structure of FIGS. 7–9 in the same manner as they are provided in the structure of FIGS. 1–6.

Considering now the operation of the above-described apparatus of FIGS. 7–9 for the injection molding of non-foaming molding materials, alignment cylinder 146 is placed in the flow interrupting position (FIG. 7) and a first charge of molding material is prepared in injection chamber 157 in the manner described above with respect to the embodiment of FIGS. 1–6.

Upon completion of the preparation of the first charge of material, valve plate 136 is disposed in flow interrupting position (as shown by broken lines in FIG. 9) by fluid motor 172, alignment cylinder 146 is rotated to flow permitting position and screw drive 158 is advanced to inject molding material from injection chamber 157 into accumulator chamber 179.

Thereafter, alignment cylinder 146 is repositioned in the flow interrupting position and a second charge of molding material is prepared in injection chamber 157. Upon the completion of the preparation of the second charge of molding material, valve plate 136 is displaced to flow permitting position and fluid motors 181 and 182 are actuated to commence the advancement of pistons 175 and 176 within chamber 179 to form molding material from accumulator chamber 179 into mold cavity 133. Upon the completion of the advance of pistons 175 and 176, they are locked in position by fluid motors 181, 182 or by mechanical devices (not shown) as was discussed above, and maintained in advanced position during the injection and pressurization of molding material by screwdrive 158. Thus, with pistons 175 and 176 in advanced position, alignment cylinder 146 is rotated to flow permitting position and screwdrive 158 is advanced to continue the injection of molding material into mold cavity 133. Upon the completion of the filling of mold cavity 133, motor 172 is actuated to displace valve plate 136 into flow interrupting position thereby isolating mold cavity 133 from accumulator chamber 179. At this stage of the molding cycle, material in mold cavity 135 is permitted to set while, in melting and injection section 114 and accumulator 135, new charges of molding material are being prepared for the next subsequent molding cycle.

Prior to the completion of the preparation of material for the next subsequent cycle, the material within cavity 133 will have set sufficiently to allow ram 128 to be retracted thereby to retract mold section 130 and permit the removal of the molded article. With the article so removed, ram 128 is advanced to reposition mold section 130 and redefine mold cavity 133, and the injection cycle is repeated.

The operation of the apparatus of FIGS. 7–9 to inject foamable molding materials is similar to the operation for the injection molding of non-foamable materials. Specifically, valve plate 136 is positioned in flow-interrupting position and a first charge of foamable molding material is prepared in the manner described above. Upon the completion of the preparation of the first charge of material, alignment cylinder 146 is rotated to flow permitting position and screwdrive 158 is advanced to displace molding material from injection chamber 157 into accumulator chamber 179. During the advancement of screwdrive 158, fluid motors 181 and 182 are actuated to retract pistons 175 and 176 at a rate which enables sufficient pressure to be maintained on the molding material to preclude premature foaming thereof. Upon the completion of advancement of screwdrive 158, alignment cylinder is rotated to flow interrupting position and a second charge of foamable molding material is prepared in injection chamber 157 while pressure is being maintained on the material in accumulator chamber 179 by pistons 175 and 176.

With a second charge of foamable molding material now prepared within injection chamber 157, valve plate 136 is displaced to flow permitting position and pistons 175 and 176 are advanced to commence injection of the foamable molding material into mold cavity 133. Upon the complete advancement of pistons 175 and 176 alignment cylinder 146 is rotated to flow permitting position and injection is continued by the advancement of screwdrive 158 until mold cavity 133 is filled with foamable molding material under pressure to prevent foaming. The material in cavity 133 is then permitted to set under pressure so as to form a hard outer shell as discussed above with respect to FIGS. 1–6, and upon the formation of a shell of desired thickness, the alignment cylinder is rotated to flow interrupting position and pistons 175 and 176 are fully retracted by fluid motors 181 and 182 to relieve the pressure on the foamable molding material and to allow expansion thereof out of mold cavity 133 and into accumulator chamber 179. During the expansion of the molding material and egress thereof from mold cavity 133, a new charge of material may be prepared in injection chamber 157 for use in the next subsequent molding cycle.

Upon the completion of the expansion of molding material within die cavity 133, valve plate 136 is displaced into flow interrupting position, pistons 175 and 176 are advanced more fully retracted positions (not shown) to partially retracted positions (FIG. 7) so as to recompress the excess molding material which was expelled from mold cavity 133 during expansion, mold section 130 is separated from mold section 132 and the molded article is removed. Thereafter, mold section 130 is repositioned to redefine cavity 133 and the cycle is repeated. It can be seen, however, that the material which had been discharged from mold cavity 133 during foaming in the prior cycle has now been recompressed t become the first charge of material for the next subsequent cycle. Thus, after an initial injection molding cycle, the process can be repeated with the preparation of only one additional charge of material for each injection cycle.

The present method can be practiced using available materials such as high and low density polyethylene, rigid and flexible polyvinylchloride, general purpose polystyrene, impact grades of polystyrene, acrylonitrile butadiene styrene, polyphenylene oxide, polcarbonate, polypropylene, ethylene vinyl acetate copolymer, and nylon. Where the manufacture of an article requires the molding of foamable molding material, any of the above materials may be blended with a blowing agent and used in foam molding. Thus, for example, the present method of foam molding has been practiced using commercially high density polyethylene copolymer (containing about 1 percent of butene-1), dry blended with up to 2 percent (2percent) by weight of azodicarbonamide ($NH_2 \cdot CO \cdot NH \cdot CO \cdot NH_2$) as a blowing agent. Additionally, other blowing agents which may be utilized are the low boiling point alcohols such as methanol and propanol; the low boiling ethers such as dimethyl ether and chlorofluoroalkanes such as 1,2-dichlorotetrafluoroethane. Each of the above listed resins has been utilized in the practice of the invention and, in this regard, no such resin has been found which cannot be used in the present process, it being only necessary to change the type and/or percentage of blowing agent which is within the skill of those who are skilled in this art.

It should also be emphasized that the accumulator of the invention is a low pressure structure, therefore relatively inexpensive, which may be mounted either on the front plate of the apparatus or on the stationary mold as may be desired. Further, the accumulator is adaptable for incorporation as a separate device so that it may be utilized to increase the capacity of existing injection molding machines with relatively little difficulty and at small expense.

The foregoing description of methods and apparatus according to the invention relate to significant improvements in the art of injection molding. In this regard, it should be understood that many modifications and variations of the present invention are possible in the light of the above teachings without departing from the spirit and scope of the invention. Accordingly, the present invention contemplates these modifications and variations as falling clearly within the scope of the present inventive concept.

What we claim is:

1. The method of injection molding a molding material to form an article including the steps of:
   melting a first charge of molding material in a chamber so as to prepare the charge for injection into a mold having a mold cavity;
   injecting said first charge of molding material from said chamber through a passage into an accumulator;
   maintaining said first charge of molding material within said accumulator while concurrently melting a second charge of molding material in said chamber so as to prepare the charge for injection into a mold having a mold cavity;
   injecting said first charge of molding material from said accumulator into said mold cavity;
   injecting said second charge of molding material from said chamber into said mold cavity;
   retaining said first and second charges of molding material within said mold cavity while allowing said material to set to take on the shape of said article; and
   removing said article from said mold cavity.

2. The method of injection molding according to claim 1 wherein said step of injecting said first charge of molding material into said mold cavity comprises:
   advancing piston means against said molding material contained in said accumulator.

3. The method of injection molding a foamable molding material including the steps of:
   melting a first charge of foamable molding material in a chamber so as to prepare the charge for injection into a mold having a mold cavity;
   injecting said first charge of foamable molding material from said chamber into an accumulator at a pressure sufficiently high to prevent foaming;
   maintaining said first charge of foamable molding material in said accumulator at a pressure sufficiently high to prevent foaming;
   melting a second charge of foamable molding material in said chamber so as to prepare the charge for injection into a mold having a mold cavity;
   injecting said first charge of foamable molding material from said accumulator into said mold cavity at a pressure sufficiently high to prevent foaming;
   injecting said second charge of foamable molding material from said chamber into said mold cavity at a pressure sufficiently high to prevent foaming;
   allowing said first and second charges of foamable molding material under pressure to set in said mold cavity so as to take on the shape of said mold cavity and form a solid skin around the inner surface of said mold cavity; and
   relieving the pressure from said foamable molding material so as to allow the foaming thereof within said solid skin and the expulsion of excess material out of said mold cavity into said accumulator.

4. A method of injection molding as claimed in claim 3 and further including the step of:
   recompressing said excess material within said accumulator for use as a charge for the next subsequent molding cycle.

5. A method of injection molding according to claim 3 wherein said step of maintaining said first charge of foamable molding material in said accumulator at a pressure sufficiently high to prevent foaming includes:
   advancing a piston means mounted in said accumulator against the foamable molding material of said first charge.

6. A method of injection molding according to claim 3 wherein said accumulator has a piston mounted therein, wherein said step of maintaining said first charge of foamable molding material at a pressure sufficiently high to prevent foaming comprises exerting a force against said first charge of molding material through said piston; and wherein said step of injecting said first charge of foamable molding material comprises advancing said piston against said first charge of foamable molding material to displace said first charge from said accumulator and into said mold cavity.

7. A method of injection molding as claimed in claim 6 wherein said step of relieving the pressure for said foamable molding material comprises retracting said piston within said accumulator.

8. A method of injection molding at least two articles from a foamable molding material including the steps of:

melting a first charge of foamable molding material in a chamber so as to prepare the charge for injection into a mold having a mold cavity;

injecting said first charge of foamable molding material from said chamber through a passage into an accumulator at a pressure sufficiently high to prevent foaming;

maintaining said first charge of foamable molding material in said accumulator at a pressure sufficiently high to prevent foaming;

melting a second charge of foamable molding material in said chamber so as to prepare the charge for injection into a mold having a mold cavity;

injecting said first charge of foamable molding material from said accumulator into said cavity at a pressure sufficiently high to prevent foaming;

injection said second charge of foamable molding material from said chamber into said mold cavity at a pressure sufficiently high to prevent foaming;

allowing said first and second charges of foamable molding material under pressure to set in said mold cavity so as to take on the shape of said mold cavity and form a solid skin around the inner surface of said mold cavity to form one article;

relieving the pressure from said foamable molding material so as to allow the foaming thereof within said solid skin and the expulsion of excess material out of said mold cavity into said accumulator;

allowing said foamed molding material within said solid skin to set;

removing said one article from said mold cavity;

recompressing said excess molding material within said accumulator to form a first charge of molding material for a next subsequent molding cycle;

melting a further charge of foamable molding material in said chamber so as to define a second charge for injection into said mold cavity during said next subsequent molding cycle;

injecting said first charge of foamable molding material from said accumulator into said mold cavity at a pressure sufficiently high to prevent foaming;

injecting said second charge of foamable molding material from said chamber into said mold cavity at a pressure sufficiently high to prevent foaming;

allowing said first and second charges of foamable molding material under pressure to set in said mold cavity so as to take on the shape of said mold cavity and form a solid skin around the inner surface of said mold cavity to form a second article;

relieving the pressure from said foamable molding material so as to allow the foaming thereof within said solid skin and the expulsion of excess material out of said mold cavity into said accumulator for use as the first charge in a next subsequent molding cycle;

allowing said foamed molding material within said solid skin to set; and removing said second article from said mold cavity.

* * * * *